(12) United States Patent
Sweeting et al.

(10) Patent No.: US 8,019,672 B2
(45) Date of Patent: Sep. 13, 2011

(54) DYNAMIC PRICE IMPROVEMENT

(75) Inventors: Michael Sweeting, Aldershot (GB); Jim Johnson, London (GB)

(73) Assignee: BGC Partners, Inc., New York, NY (US)

( * ) Notice: Subject to any disclaimer, the term of this patent is extended or adjusted under 35 U.S.C. 154(b) by 1117 days.

(21) Appl. No.: 10/826,779

(22) Filed: Apr. 16, 2004

(65) Prior Publication Data
US 2004/0243505 A1    Dec. 2, 2004

Related U.S. Application Data

(60) Provisional application No. 60/463,835, filed on Apr. 16, 2003.

(51) Int. Cl.
*G06Q 40/00* (2006.01)
(52) U.S. Cl. .............................. 705/37; 705/35
(58) Field of Classification Search ........................ None
See application file for complete search history.

(56) References Cited

U.S. PATENT DOCUMENTS

| | | |
|---|---|---|
| 5,136,501 A | 8/1992 | Silverman et al. |
| 5,878,416 A | 3/1999 | Harris et al. |
| 5,905,974 A * | 5/1999 | Fraser et al. ................ 705/36 R |
| 6,021,397 A | 2/2000 | Jones et al. |
| 6,098,051 A | 8/2000 | Lupien et al. |
| 6,850,907 B2 | 2/2005 | Lutnick et al. |
| 7,162,448 B2 * | 1/2007 | Madoff et al. ................... 705/37 |
| 7,209,896 B1 * | 4/2007 | Serkin et al. .................... 705/37 |
| 7,212,999 B2 | 5/2007 | Friesen et |
| 7,225,151 B1 * | 5/2007 | Konia ............................. 705/37 |
| 7,383,220 B1 * | 6/2008 | Keith .............................. 705/37 |
| 7,392,214 B1 * | 6/2008 | Fraser et al. ................... 705/37 |
| 7,533,052 B2 * | 5/2009 | Tilfors et al. .................. 705/37 |

(Continued)

FOREIGN PATENT DOCUMENTS

GB    2389687    12/2003

(Continued)

OTHER PUBLICATIONS

Is the Specialist System Doomed? With Dick Grasso gone, more trouble is brewing for NYSE specialists.; Watkins, Steve; Traders Magazine; Nov 1, 2003; 5-pages.*

(Continued)

*Primary Examiner* — Alexander Kalinowski
*Assistant Examiner* — Gregory Johnson
(74) *Attorney, Agent, or Firm* — David E. Boundy (57) ABSTRACT

A system and method is provided to enable traders to price improve on an item at an amount less than a predetermined pricing increment. Traders can improve on the price of the item using different price improvement levels (e.g., four different levels). The price improvement according to the invention is a dynamic price improvement, which enables a dynamic order to maintain a predetermined position in a trading stack relative to other orders in the stack. The dynamic order may maintain its position in the trading stack by adjusting (e.g., increasing or decreasing) its price improvement level depending on market conditions. For example, a dynamic order may increases its price improvement level such that it stays at least one level ahead of the next best order in the trading stack. If the level cannot be further increased, the dynamic order may use its timestamp to maintain its position in the stack.

31 Claims, 8 Drawing Sheets

U.S. PATENT DOCUMENTS

| | | | |
|---|---|---|---|
| 7,558,753 B2* | 7/2009 | Neubert et al. | 705/37 |
| 7,574,395 B2 | 8/2009 | Sweeting | |
| 7,660,761 B2* | 2/2010 | Zhou et al. | 705/37 |
| 2001/0042785 A1 | 11/2001 | Walker et al. | |
| 2001/0044767 A1 | 11/2001 | Madoff et al. | |
| 2001/0044770 A1 | 11/2001 | Keith | |
| 2002/0169703 A1 | 11/2002 | Lutnick et al. | 705/37 |
| 2003/0033212 A1 | 2/2003 | Sandhu et al. | |
| 2003/0046218 A1* | 3/2003 | Albanese et al. | 705/37 |
| 2004/0117302 A1 | 6/2004 | Weichert et al. | |
| 2004/0210511 A1* | 10/2004 | Waelbroeck et al. | 705/37 |
| 2004/0254804 A1* | 12/2004 | Peterffy et al. | 705/1 |
| 2006/0229967 A1 | 10/2006 | Sweeting | |
| 2010/0250425 A1 | 9/2010 | Sweeting | |

FOREIGN PATENT DOCUMENTS

| | | |
|---|---|---|
| WO | WO 97/08640 | 3/1997 |
| WO | WO 00/38093 | 6/2000 |
| WO | WO 00/57307 | 9/2000 |
| WO | WO 00/67172 | 11/2000 |

OTHER PUBLICATIONS

Price Improvement Belongs to Dealers, Professor Says; Byrne, John A; Traders Magazine; Jan 1, 2003; 2-pages.*

Market microstructure: A practitioner's guide; Ananth Madhavan; Financial Analysts Journal, Charlottesville; Sep./Oct. 2002. vol. 58, Iss. 5; 17-pages.*

Much ado about order flow; Allen Ferrell; Regulation, Washington; Spring 2002; vol. 25, Iss. 1; 6-pages.*

Phillip H. Wiggins, Dow Jumps 25.83 Points to 2,519.77, N.Y. Times, Jul. 29, 1987 at D1.

UK Patent Office Communication and Examination Report for Application No. GB 0408554.4, Jul. 31, 2006 (3 pages).

USPTO Office Action for U.S. Appl. No. 10/171,009, Sep. 20, 2007 (13 pages).

USPTO Examiner Interview Summary Record and Notice of Allowance and Fees Due for U.S. Appl. No. 10/171,009, Oct. 14, 2008 (10 pages).

USPTO Office Action for U.S. Appl. No. 12/412,119, Jan. 6, 2011 (16 pages).

* cited by examiner

| | 504 | 506 | 508 | | 520 |
|---|---|---|---|---|---|
| | 100.06 | HIT 10 | 0 X 90 | | ◇ |
| ITEM | 100.050 -   100.06 +   22 X 20 | | | 0 | 20 |
| | 100.05 + -  100.66     22 X 25 | | | 0 | 30 |
| | 100.052 | | | | 40 |

502 — ITEM
500
516   514   512

DYNAMIC PRICE IMPROVEMENT

CROSS-REFERENCE TO A RELATED PATENT APPLICATION

This application claims the benefit of U.S. Provisional Application No. 60/463,835, filed Apr. 16, 2003, the disclosure of which is hereby incorporated by reference in its entirety.

BACKGROUND OF THE INVENTION

The present invention relates to systems and methods for providing electronic trading systems, and more particularly to trading systems that allow traders to improve prices for a particular item.

Electronic trading systems provide a platform for which traders can trade items such as financial instruments (e.g., stocks, bonds, securities, futures, contracts, currency, etc.) or household goods (e.g., old records, antiques, sports cards, etc.). In many of these trading systems, bid/offer-hit/lift processes are used to negotiate a sale of a given item. In connection with such processes, traders may submit bids (i.e., prices they are willing to purchase an item) and/or offers (i.e., prices they are willing to sell an item). A trader may respond to bids or offers by submitting sell (or hit) or buy (or lift or take) commands to the trading system. A trade is executed when a trader issues a hit or lift (or take) command in response to a bid or offer, respectively.

The prices at which bids and offers can be submitted usually conform to some sort of fixed interval or increment, where the interval is set by the trading system or dictated by the type of item being traded. For example, if a trader is trading United States Treasuries in a brokerage trading system, that trader can submit bid or offer prices that vary by ¼ of ¹⁄₃₂nd of a point in Treasuries up to a maturity of under 10 years, and ½ of ¹⁄₃₂nd of a point for maturities over 10 years and over. If traders desire to submit bids or offers that are more competitively priced than other prices, they are limited to submitting bids or offers at the predetermined pricing intervals.

Therefore, it is an object of the invention to provide systems and methods for enabling traders to improve on the price of a particular item, within the predetermined pricing increments.

SUMMARY OF THE INVENTION

This and other objects of the invention are accomplished by providing an electronic trading system that allows traders to submit orders with price improvement, the improvement being at an amount less than a predetermined pricing increment. More particularly, the price improvement according to the invention relates to dynamic price improvement.

In general, price improvement enables one or more traders to improve on a price for an item being traded in a market, without having to improve on the price using the predetermined pricing increment. Traders can improve on the price of an item using different price improvement levels. This allows traders to select among different aggressive price improvement increments to price improve, for example, on a bid, offer, buy, or sell price. For example, the trading system may provide several price improvement levels (e.g., four levels) for which the trader can improve the price.

A price improvement level may improve on a particular price at a fraction of the predetermined pricing increment of the item being traded, with the particular price improvement level being a multiple of the fraction. The fraction of the standard increment may depend on the particular price improvement level chosen (e.g., a price improvement level of one, two, three, etc.). For example, the two-year United States government bond may trade at standard increments of ¼ of ¹⁄₃₂ of a nominal value. Thus, trading two-year U.S. government bonds with price improvement enables a trader to submit an order that slightly improves on a price at a fraction of the (¼ of ¹⁄₃₂ for a 2 year maturity) predetermined pricing increment. Assuming for example that the price improvement increment is equivalent to one eighth of the predetermined pricing increment, a price improvement level of one may improve the price by one eighth of the predetermined pricing increment, and a price improvement level of three may improve the price by three eighths of the standard increment.

An order having a dynamic price improvement level according to the invention enables the order to change its price improvement level (e.g., the level may change from one to three to two) depending on market conditions. The dynamic price improvement level does not have a fixed price improvement level—it is dynamic. The price improvement level of the dynamic order can vary from a price improvement level of zero to the maximum price improvement level available. Thus, depending on market conditions, a dynamic price improvement level order may, for example, have a price improvement level of one at a first instance and a price improvement level of four at a second instance.

The dynamic nature of the price improvement level enables a dynamic order to maintain a predetermined position in a trading stack. A trading stack typically includes orders that have not been matched with a contra order. Generally, orders at the top of the stack are matched before orders at the bottom of the stack. Using price improvement, traders are able to submit price improved orders in an attempt to "jump" to the top of the stack so that their order will be matched before other orders in the stack.

Dynamic orders can modify their price improvement levels such that they maintain a predetermined position relative to other orders in the stack. For example, if a dynamic order is initially placed at the top of the stack, the dynamic order can change (e.g., increase) its price improvement level to maintain its position at the top of the stack when new orders are submitted with price improvement levels that exceed or match that of the dynamic order.

Dynamic orders may have a timestamp indicating the time at which the order is submitted to the trading system. The timestamp may be used to determine the dynamic order's position in the stack when its price improvement level is the same as another order and its price improvement level cannot be increased beyond the maximum price improvement level.

BRIEF DESCRIPTION OF THE DRAWINGS

The above and other objects and advantages of the invention will be apparent upon consideration of the following detailed description, taken in conjunction with accompanying drawings, in which like reference refers to like parts throughout, and in which.

DESCRIPTION OF THE INVENTION

As defined herein, price improvement refers to the ability to submit orders that improve on a price for a particular item at an amount less than a predetermined pricing increment. A predetermined pricing increment is typically defined by the instrument being traded. For example, the two-year United States government bond may trade at predetermined pricing increments of ¼ of ¹⁄₃₂ of a nominal value. Thus, in conventional trading systems, a user has to submit a traditional order, which varies in price only by the predetermined pricing increment.

In a trading system that uses price improvement, traders can submit price improved orders that improve on the price at fractions of the pre-determined pricing increment. For example, a trading system may include three levels of price improvement in which a trader can improve the price. If a trader submits an order with a price improvement level of one (e.g., the first level of price improvement), that order improves on a predefined price (e.g., price at which an item is being traded or a price submitted in response to a request for quote) by a predefined fraction of the predetermined pricing increment. A price improved order with a price improvement level of two (e.g., the second level of price improvement) improves on the predefined price by twice the predefined fraction of the predetermined pricing increment. Note that the number of price improvement levels is not limited to a particular number of levels, and that a predetermined number of levels can be used.

The foregoing discussion is not meant to be thorough discussion of price improved orders, but merely an illustrative discussion that sets forth the framework in which dynamic price improved orders according to the invention operate. A detailed description of price improved orders can be found, for example, in U.S. patent application Ser. No. 10/171,009, filed Jun. 11, 2001.

In accordance with the present invention, traders can submit orders using a dynamic BEST price improvement level (hereinafter "dynamic price improvement level"). A dynamic price improvement level is a price improvement level that ensures that the dynamic price improved order maintains a predetermined position within the stack. That is, if the dynamic order is placed on top of the stack, it remains at the top of the stack until it is matched or cancelled.

Each dynamic price improvement order has a price improvement level and a timestamp. The price improvement level is a non-traditional price improvement on a traditional price increment such as the level one, two, or three price improvement level, as discussed above. The timestamp indicates the time at which the dynamic order is submitted, and may be used to establish priority over other orders that have the same price improvement level, including other dynamic orders.

Figure 1:
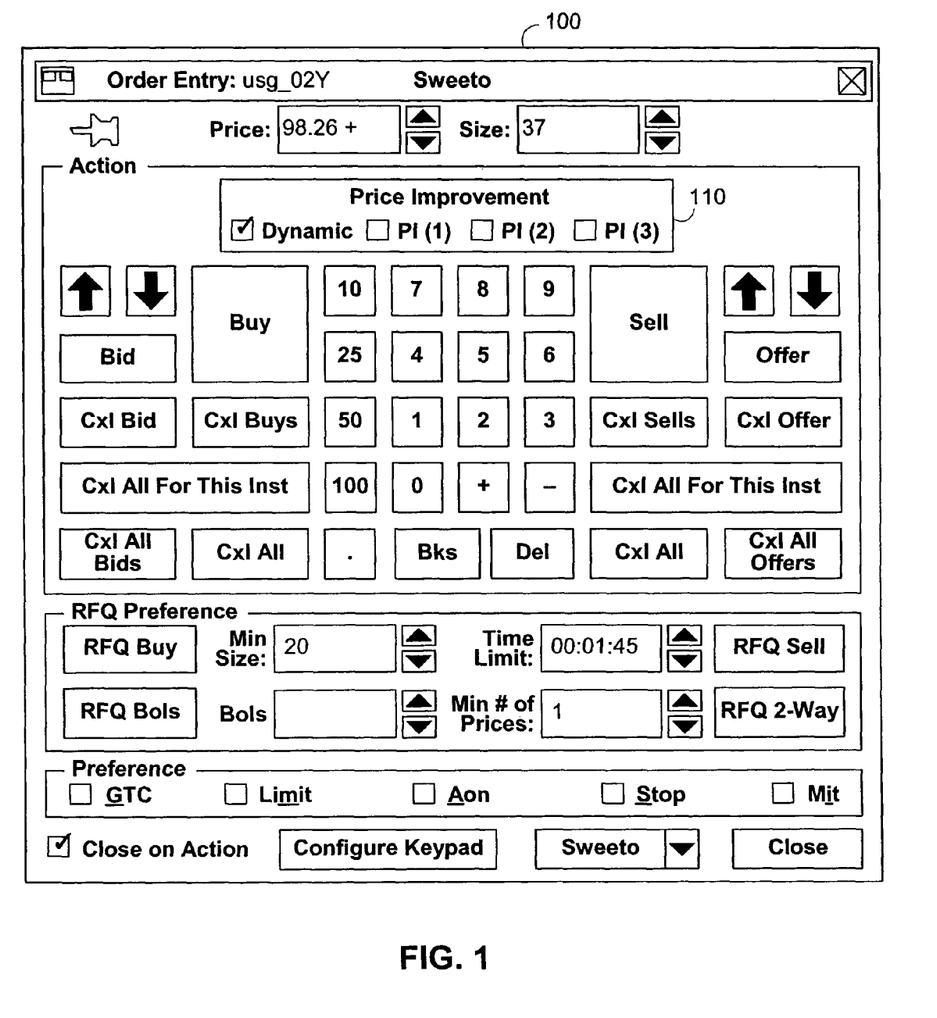
FIG. 1 is an illustration of a dialog window that may be generated in accordance with certain embodiments of the present invention.
Figure 7:
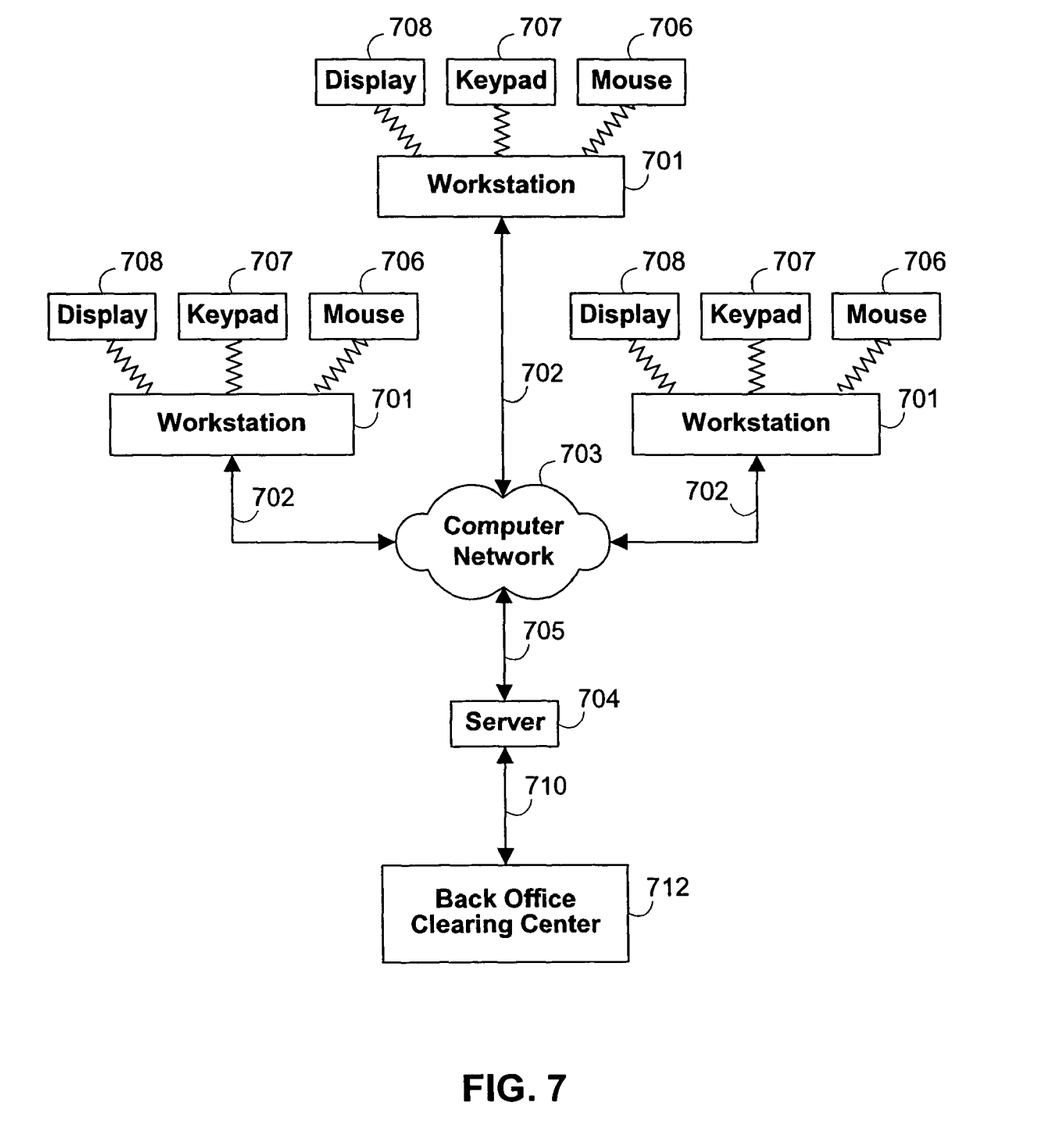
FIG. 7 is a block diagram of a system that may be used to implement the processes and functions according to the invention.

FIG. 1 illustrates one embodiment of a graphical interface 100 for submitting trading commands using, for example, a workstation as shown in FIG. 7. Interface 100 includes price improvement trading box 110, which has first, second, and third price improvement level options and a dynamic best price improvement option that can be selected by the trader. If a trader wishes to trade with dynamic price improvement, the dynamic price option in box 110 can be selected.

In trading systems where the dynamic price improvement is default, the dynamic price option in box 110 may be selected automatically. Alternatively, price improvement box 110 may not be displayed when the dynamic price improvement level is default.

Persons skilled in the art will appreciate that the above description with respect to FIG. 1 is not intended to be an exhaustive description of various features that can be included with dialog window 100. It does, however, discuss features pertinent to describing the present invention. U.S. patent application publication No. 2002-0029180 published Mar. 7, 2002, which is hereby incorporated by reference in its entirety, provides a substantial description of dialog window 100.

Price improvement trading of the present invention can be implemented with a variety of trading schemes such as, for example, Direct Dealing (hereinafter "DD") (sometimes referred to as "Request for Quote" style trading) and traditional market style trading. In DD style trading, there are requesters and responders. The requesters can enter a request for prices on a particular item or instrument. A responder may submit prices in response to that request. The requester may then choose to trade with one of the responders. This invention enables the responders to use dynamic price improvement to improve on the prices submitted in response to the request, thereby enhancing the position of the improving trader relative to the other responding traders (i.e., the requesting trader may be more likely to accept the dynamically improved quote over the other responder's non price-improved quotes).

Traditional market style of trading enables traders to submit bids and offers for a particular item. Traders can hit a bid or lift an offer to commence trade. Traditional market style of trading may also enable traders to submit buy and sell orders This invention allows traders to use dynamic price improvement to improve on bids and offers, and buy and sell orders that are being traded in a market.

An advantage of dynamic price improvement according to the invention is that the price improvement level of the order is dynamic. That is, the price improvement level for a particular order may increase or decrease depending on market conditions. This creates a trading scheme in which the dynamic order changes to maintain its position relative to the other orders in the stack, thereby maintaining its position in the stack. For example, if a trader submits a dynamic order and that order is placed at the top of the stack, this order maintains its position at the top of the stack, while the price of the item being traded is maintained at its predetermined price increment price, by adjusting its price improvement level (e.g., increase its price improvement level such that it exceeds the price improvement level of the next best order by one level) until it is matched with a contra order or cancelled.

The dynamic order may increase its price improvement level up to a maximum price improvement level, at which point it uses its original timestamp to. maintain its position at the top of the stack where the timestamp is older than subsequent orders.

The presence of dynamic orders in the stack may cause the system to decrease the price improvement level of certain price improved orders submitted subsequent to dynamic orders such that the price improvement level of the dynamic orders are not inflated when such inflation is not needed to maintain their respective positions in the stack. Thus, this avoids using unnecessary price improvement levels on orders that cannot improve their position in the stack by virtue of the pre-existing dynamic price improvement order. For example, assume that a dynamic order is in a stack with a price level of two. Then a trader submits a price improved order with a price improvement level of three, which in this case is assumed to be the maximum price improvement level. Instead of increasing the price level of the dynamic order to three, the system may decrease the price level of the price improved order to two. This way, the dynamic order still maintains its position in the stack, but does not have its price improvement level increased to three.

The trading system may or may not provide traders with the option of selecting which price improvement level they wish to trade. For example, in one embodiment, users may be permitted to select a specific price improvement level such as a price improvement level of one or the dynamic best price improvement level. This results in orders being arranged in a stack according to their respective price improvement levels and timestamps by default without user intervention.

In another embodiment, price improvement orders being submitted by predetermined traders may, by default, be dynamic price improved orders. The system may select which traders' orders are default price improved orders or the traders themselves may choose to have their price improved orders by dynamic price improved orders by default.

Figure 2:
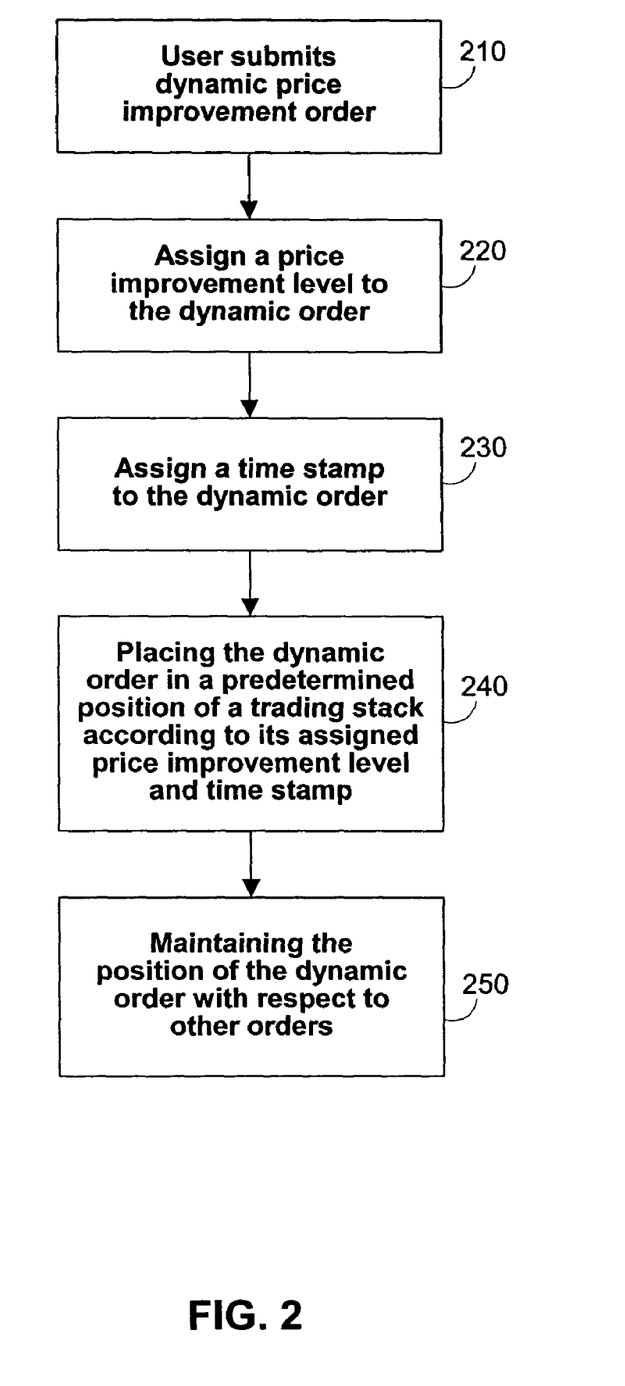
FIG. 2 shows an illustrative flowchart of submitting a dynamic price improvement order in a trading system according to the invention.

FIG. 2 shows a flowchart 200 that illustrates use of a dynamic price improvement order according to the invention. Starting at step 210, a user submits a dynamic price improvement order using, for example, a dialog window 100 of FIG. 1. At step 220, the trading system assigns a price improvement level to the dynamic order. The assigned price improvement level may depend on factors including, but not limited to, orders currently in the stack, the price improvement level of orders in the stack, other dynamic orders in the stack, and the timestamps of orders in the stack.

For example, if the dynamic order is the first order to be submitted, the system may initially assign that order a price improvement level of zero. In the case where orders already exist in the stack, but the orders are not dynamic orders, the system may assign a price improvement level that is one level higher than the highest price improvement level associated with any of the existing orders. For example, if the stack has an order with a price improvement level of one (but is not a dynamic order), the dynamic order may be assigned a price improvement level of two. If the price improvement level of the best order in the stack is at the maximum price improvement level, then the maximum price improvement level is assigned to the dynamic order.

If a dynamic order already exists in the stack, the trading system may assign the price improvement level of the existing dynamic order to the newly submitted dynamic order. This suppresses the price improvement level of a newly submitted dynamic order to prevent inflation of the price improvement level of the dynamic order already present in the stack. The price improvement level is suppressed because the new dynamic order cannot jump in front of an existing dynamic order because of the existing order's timestamp. However, in the event the existing dynamic order is the lone order in the stack, in which case the price improvement level of the existing order is zero, the price improvement level of the existing dynamic order and the new dynamic order is increased to one, thereby promoting the advantageous use of dynamic price improvement to reward the counter party and to promote dynamic price improvement. (The reward provided to a trader for trading with dynamic price improvement is discussed below.)

At step 230, the system may assign a timestamp to the dynamic order. The timestamp indicates the time at which the dynamic order is submitted to the system and may be used to determine the particular position an order has in a stack. For example, in instances where two or more dynamic orders are submitted, the timestamp determines which order takes precedence. Note that dynamic orders may retain their original timestamp even if its price improvement level changes.

Proceeding to step 240, the system places the dynamic order in a predetermined position of a trading stack according to its assigned price improvement level and timestamp. It is understood that the predetermined position is relative and may change depending on market conditions such as submission of new orders (e.g., dynamic orders and price improvement orders), and the matching of orders, and cancellation of orders. A predetermined position is defined herein as the position a dynamic order has in a stack with respect to previously submitted orders and to subsequently entered orders. For example, if a price improved order having a maximum price improvement level is submitted before a dynamic order, the dynamic order is assigned a maximum price improvement level and may be placed below the price improved order because the price improved order has an earlier timestamp.

At step 250, the system maintains the dynamic order in the predetermined position with respect to previously submitted orders and to subsequently submitted orders. For example, if a dynamic order's predetermined position is second from the top of the stack, that order will remain second until the first order is cancelled or matched with a contra order. At this point, the predetermined position of the dynamic order shifts from being second to first (e.g., its new predetermined position). This order preferably remains first until matched or cancelled.

To maintain the dynamic order in a predetermined position, the trading system may change the price improvement level. The trading system may increase the price improvement level to maintain the order's position in the stack when an order having a price improvement level higher than the level of the dynamic order is submitted. If the price improvement level increases to the highest available level, then the system may use time priority to keep the dynamic order in its predetermined position.

Figure 3:
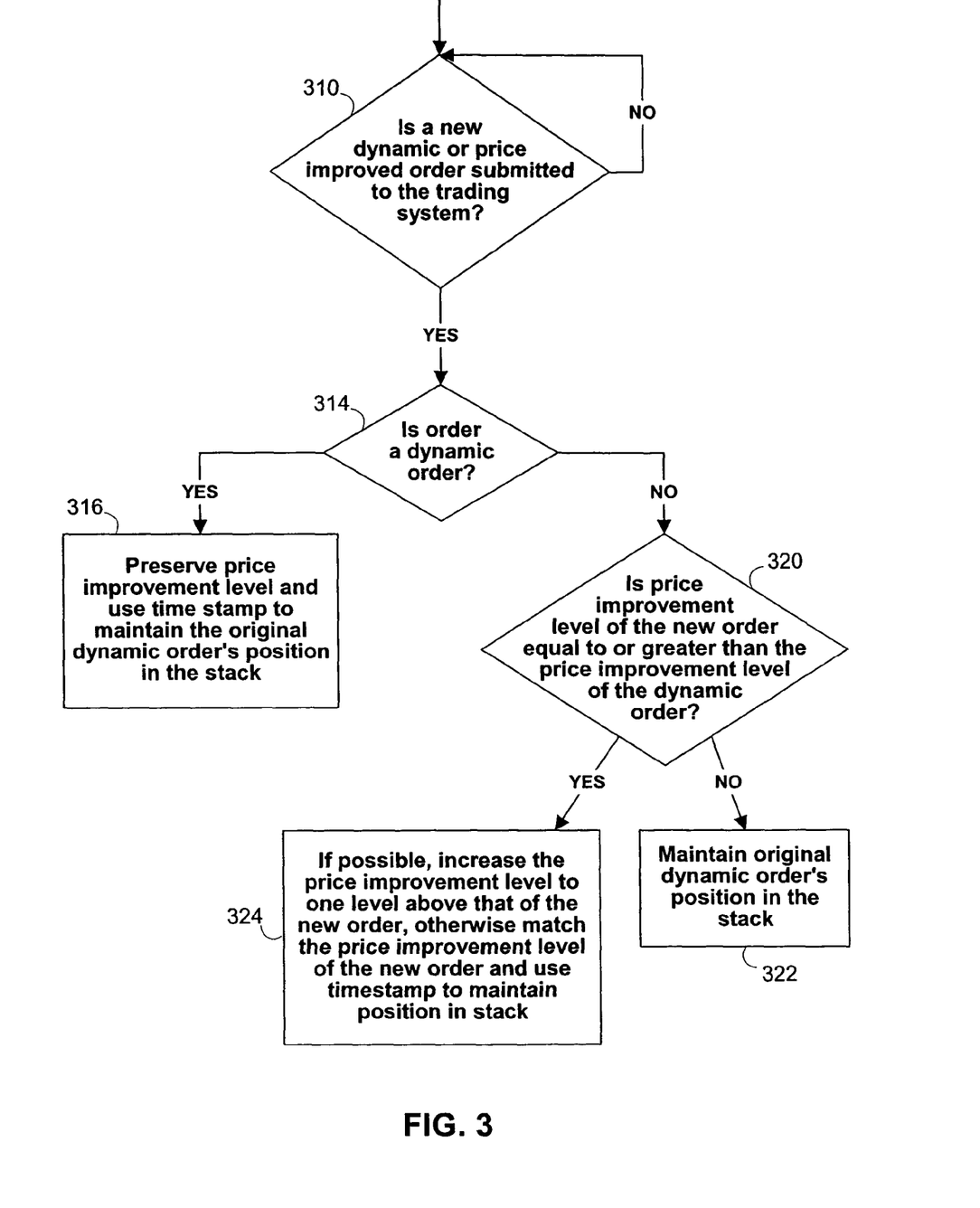
FIG. 3 shows an illustrative flowchart of how the trading system maintains a dynamic order in a particular location in a trading stack according to the invention.

FIG. 3 shows a flowchart illustrating steps that may be taken to maintain the position of a dynamic order when a new order (e.g., either a dynamic order or price improved order) is submitted according to the invention. In the context of this flowchart and for the purpose of clarity, the existing dynamic order is referred to as the original (dynamic) order.

Beginning at step 310, the system checks if a new dynamic or price improved order is submitted to the system. The system may continue to perform this check (as indicated by the feedback loop) until a new order is actually submitted, at which point the process advances to step 314. At step 314, a determination is made as to whether the new order is a dynamic order. If the new order is a dynamic order, the process proceeds to step 316, which preserves the price improvement level of the original order and uses the timestamp of the original order to maintain its position in the stack.

If the new order is not a dynamic order, the process proceeds to step 320. At step 320, the process determines whether the price improvement level of the price improved order is equal to or greater than the price improvement level of the original order. If not, then the system does not change anything with respect to the original order and it maintains its position in the stack, as indicated by step 322. However, if the price improvement level of the improved order equals or exceeds that of the dynamic order, the process proceeds to step 324. At step 324, the system may increase the price improvement level of the original order to a level (e.g., one level) above the level of the price improved order, if possible. Increasing the price improvement level of the original order ensures that the original order maintains its position in the stack. If the price improvement level of the original order cannot be increased to a level above the improved order's level, the system may match the price improvement level of the original order to the improved price order's level and use the timestamp of the original order to maintain its position in the stack.

It is understood that the steps shown in FIG. 3 are merely illustrative and that additional steps may added or some steps may be omitted.

There may be instances when the trading system decreases the price improvement level of the dynamic order. In these instances, the dynamic order maintains its position in the stack while at the same time decreasing its price improvement level. Decreasing the price improvement level puts the dynamic order in a position to provide a more advantageous execution price than if the price improvement level remained at the higher price improvement level than necessary to maintain its position in the stack.

Figure 4:
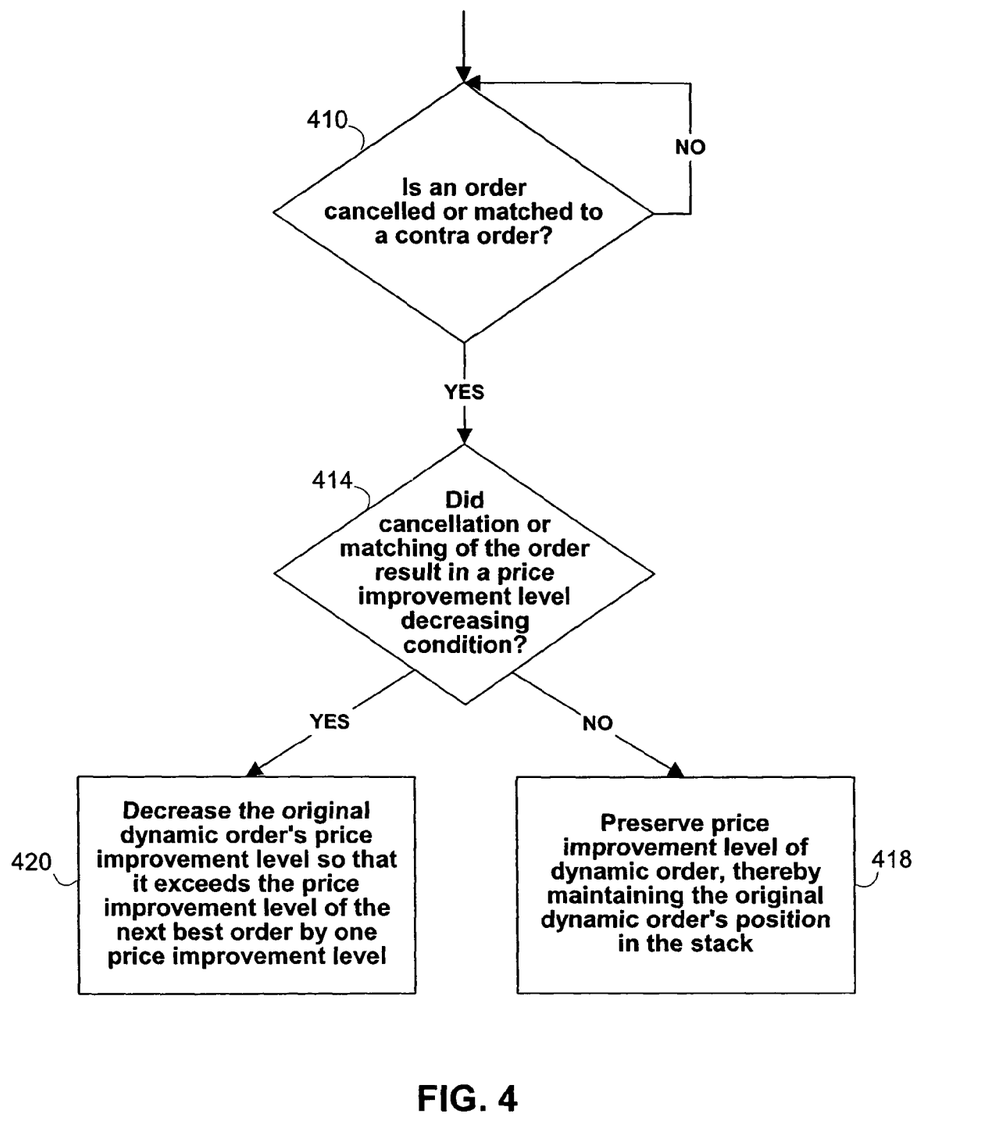
FIG. 4 shows an alternative illustrative flowchart of how the trading system maintains a dynamic order in a particular location in a trading stack according to the invention.

FIG. 4 shows a flowchart illustrating steps that may be taken when an order is cancelled or matched with a contra order according to the invention. Particularly, FIG. 4 illustrates how the system maintains a dynamic order in its predetermined position while at the same time possibly reducing the price improvement level of the dynamic order when orders are removed from the stack. In the context of this flowchart and for the purpose of clarity, the dynamic order potentially having its price improvement level reduced is referred to as the original (dynamic) order.

Beginning at step 410, the system determines whether an order is cancelled or matched to a contra order. The system may continue to perform this check (as indicated by the feedback loop) until an order is cancelled or matched, at which point the process proceeds to step 414. At step 414, the system determines whether the cancellation or matching of the order results in a "price improvement level decreasing" condition.

A price improvement level decreasing condition occurs when the original order has a price improvement level that exceeds the price improvement level of the next best order by at least two price improvement levels. By way of example assume that the original order has a price improvement level of three and the next best order has a price improvement level of one. Here the difference in price improvement levels is two, thus resulting in a price improvement level decreasing condition because the price improvement level of the original order can be reduced to two and still maintain its position in the stack.

If there is no price improvement level decreasing condition present, the process proceeds to step 418. At step 418, the system does not change the price improvement level of the original order, but continues to maintain the original order's position in the stack. If there is a price improvement level decreasing condition present, then the process proceeds to step 420.

At step 420, the system may decrease the price improvement level of the original order so that it exceeds the price improvement level of the next best order by one level. It is understood that although FIG. 4 is discussed in the context of one dynamic order, the discussion can be applied to several dynamic orders. For example, if two or more dynamic orders are in the stack, each having the same price improvement level, a cancellation of an order having a price improvement level below that of the dynamic orders may create a price improvement level decreasing condition. If the condition exists, then the price improvement level may be decreased in both dynamic orders.

It is understood that the steps shown in FIG. 4 are merely illustrative and that additional steps may be added or steps may be omitted.

Figure 5:
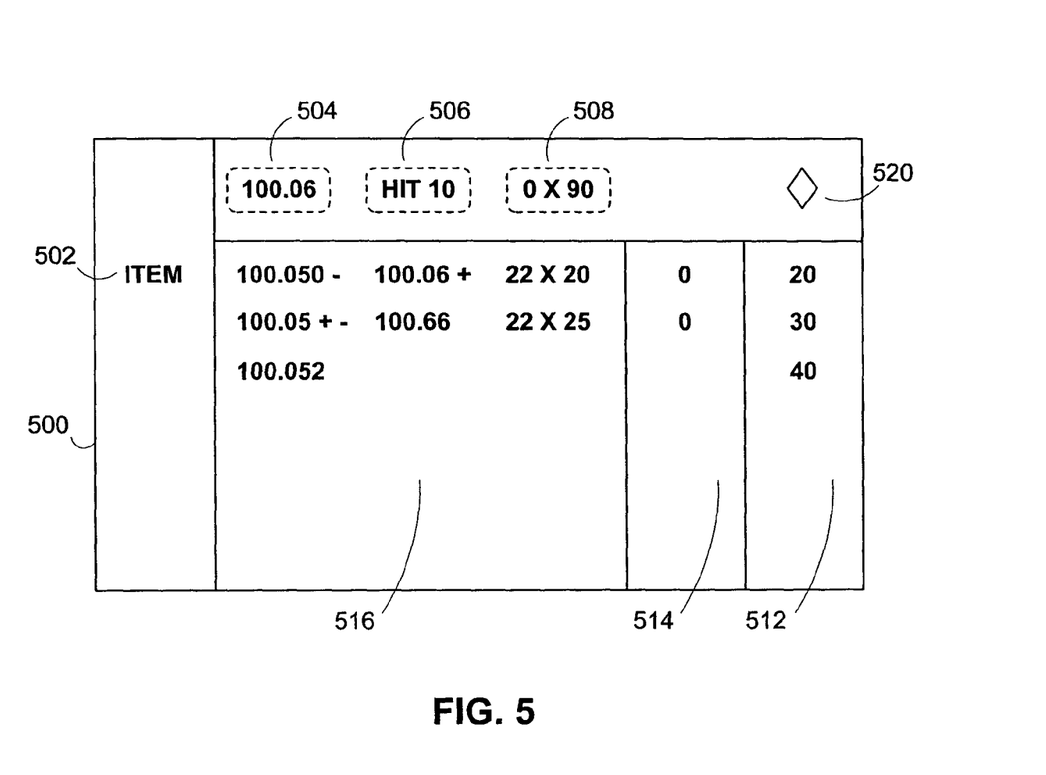
FIG. 5 shows an illustration of a market cell that may be generated according to the invention.

With reference now to FIG. 5, dynamic price improvement is described in context of market cell 500 for a selected item. FIG. 5 is described primarily in the context of a trade state in which traders are actively buying and selling an item by submitting buy and sell orders. Although FIG. 5 is being described in the context of a trade state, it is understood that dynamic price improvement of the present invention can be used in conjunction with a bid/offer state in which traders submit bids and offers for an item.

FIG. 5 illustrates a market cell 500 where users are participating in a market in which selected item 502 is being traded. Selected item 502 may be any suitable type of commodity such as, for example, securities, bonds, coupons, etc. Price 504 indicates the current selling and/or buying price of selected item 502. Trade status 506 provides an indication of what type of trading activity is taking place with respect to selected item 502. Item indicator 508 provides an indication of the quantity of selected item 502 available in the market. If, for example, sellers are operating in the active side of the market, the item indicator 508 informs market participants the total number of items 502 that are available for sale in the market. Seller stack 512 informs market participants the quantity of selected items 502 a particular seller is prepared to sell. Likewise, buyer stack 514 informs market participants the quantity of selected items 502 a particular buyer is prepared to buy. Market depth indicator 516 provides information regarding the depth of the market (i.e., the price and quantity of items available in the market, at prices different than the current price).

When a trader submits a dynamic order or a price improved order, a price improvement indicator 520 may be displayed to indicate that price improvement is taking place. Price improvement indicator 520 may be any suitable distinguishing character such as, for example, a diamond, a carrot, text (e.g., PI) or other distinguishing mark. In FIG. 5, the presence of price improvement indicator 520 indicates that at least one of the orders (e.g., the size 20, 30 or 40 orders) is price improved.

Price improvement indicator 520 informs all market participants that at least one trader is prepared to trade a specified number of items at an improved price, regardless of whether the improved price is a price improvement order or a dynamic order. But traders (except the traders. who submit price improved or dynamic orders) do not know what the price improvement level is.

Figure 6A:
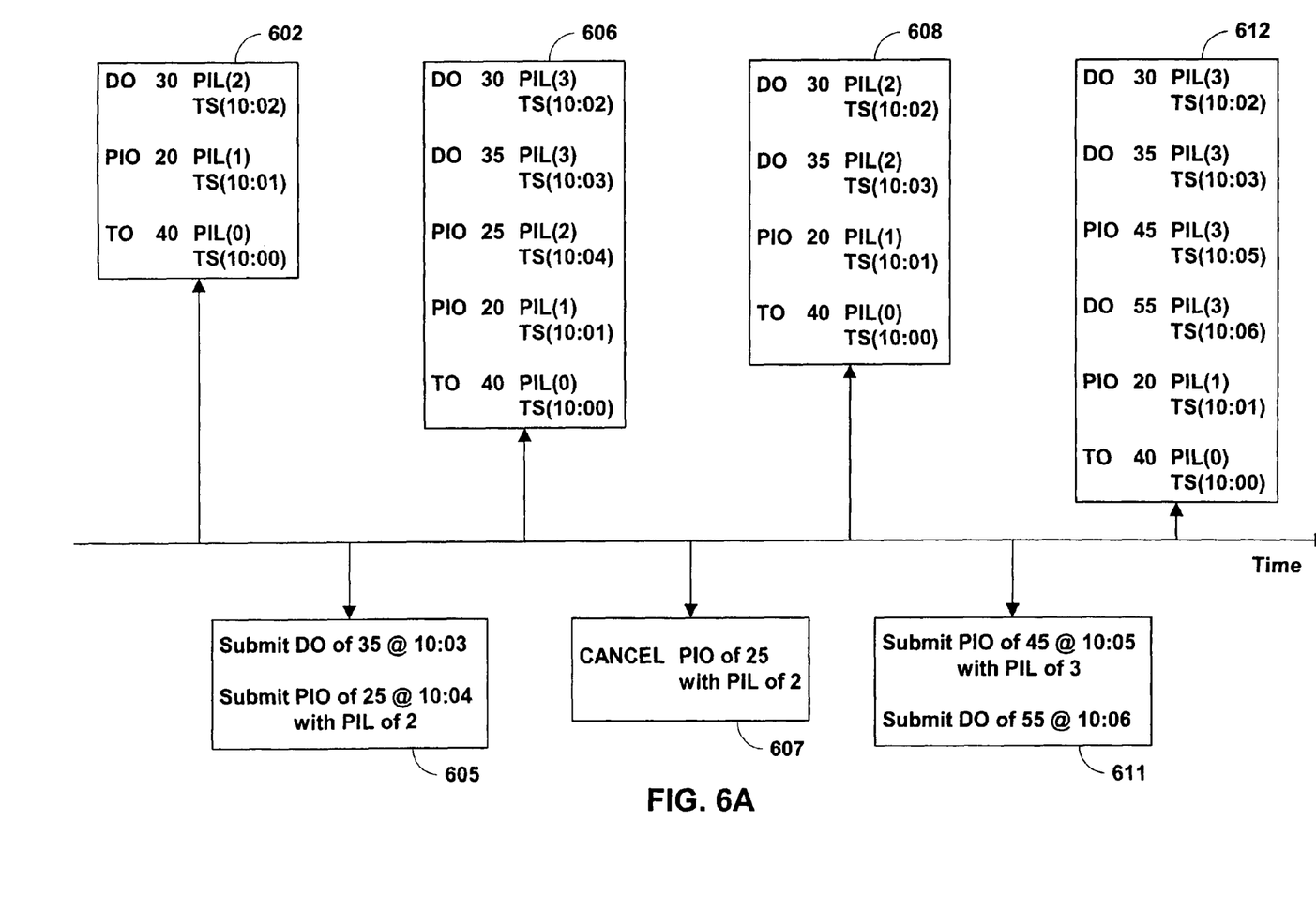
FIGS. 6A and 6B show an illustration of different modes of trading stacks that may occur according to the invention.
Figure 6B:
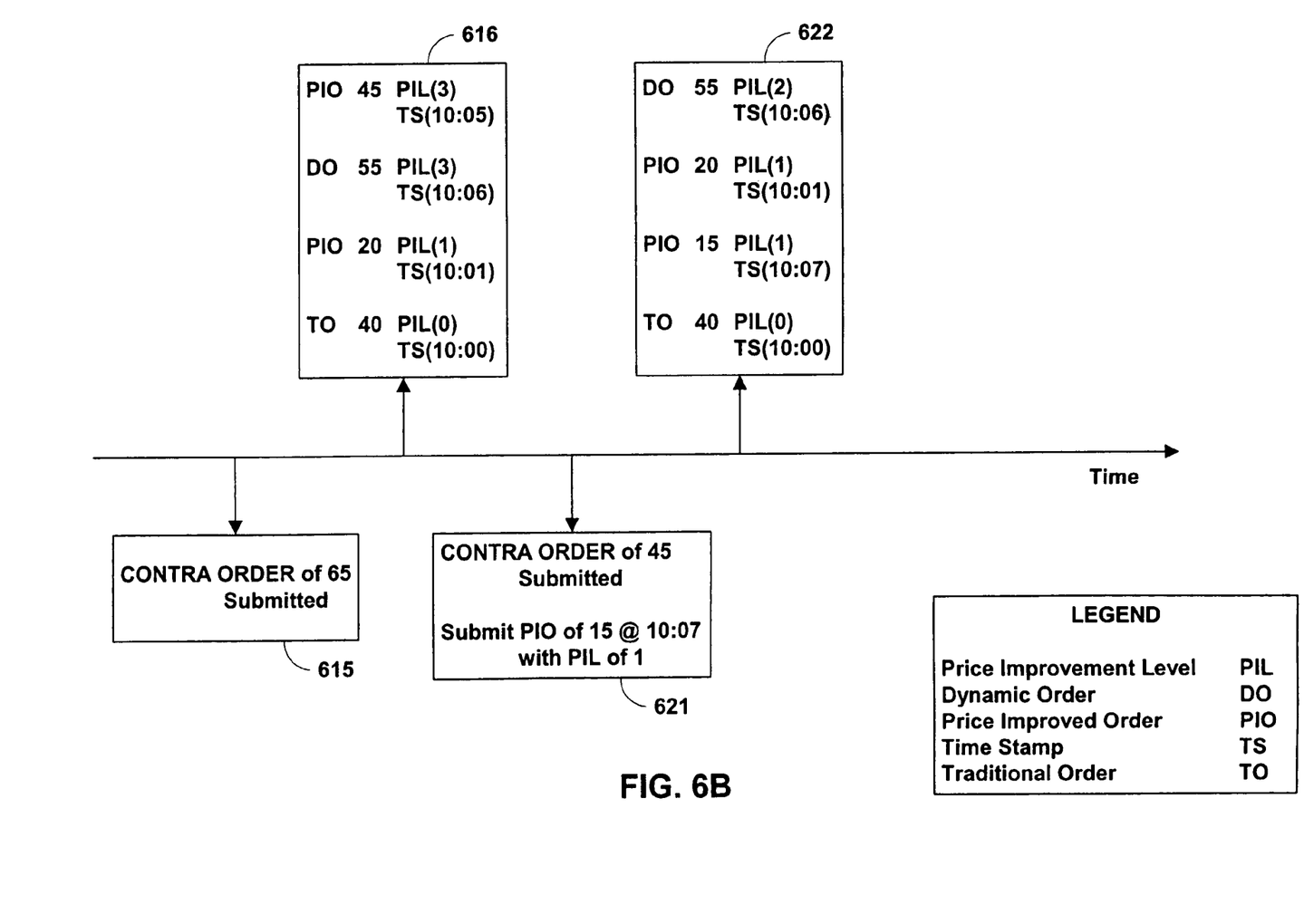

With reference now to the trading state diagram of FIGS. 6A and 6B, an example of how dynamic orders operate according to the invention is now discussed. FIG. 6 shows several sell stacks (e.g., the sell stack of FIG. 5) disposed along an axis representing time. Each stack includes orders, with each order having an order type (e.g., dynamic, price improvement, or traditional), a price improvement level (e.g., PI=1), and a timestamp (e.g., 10:03). The legend in FIG. 6B defines the attributes associated with the orders. Time progresses from left to right. Trade commands, which are shown below the time axis, may cause the trade system to modify the position of the orders in the stack. Several "snapshots" of the stack, which are shown above the time axis, are shown to illustrate how the trade system maintains the position of the dynamic orders.

Stack 602 represents an arbitrary trading stack that may occur at a particular time. Stack 602 includes a dynamic order, a price improved order, and a traditional order. When trade commands, such as those shown in trade step 605 are issued, the trading system may arrange the orders as shown in stack 606. As shown, submission of the price improved order with a price improvement level of two causes the price improvement level of the dynamic order in stack 602 to increase to a price improvement level of three. At trade step 607, the cancellation of the price improved order having the price improvement level of two results in a stack as shown in stack 608. Stack 608 shows that the price improvement level of both dynamic orders dropped down to a level of two because the next best order only has a price improvement level of one.

At trade step 611, a price improved order and a dynamic order are submitted. Stack 612 illustrates the positions of the orders after trade execution at trade step 611. Note that for the purpose of this example, the maximum price improvement level is three. Thus, when the price improved order having a price improvement level of three is submitted, this forces the price improvement level of all the dynamic orders to three. Note, however, that the dynamic order of size 55 is positioned behind the size 45 order because its timestamp is after that of the size 45 order.

Stack 616 shows the stack after the size 30 and size 35 orders are matched to a contra order submitted at trade step 615. Trade step 621 shows that a contra order of size 45 and price improved order with a price improved level of one are submitted. The contra order is matched with the price improved order of size 45, resulting in stack 622. Note that the price improvement level of the dynamic order dropped down to two from three because the next best order has a price improvement level of one.

It is understood that dynamic orders can improve on orders of different types, such as limit, stop, good-till-canceled, all-or-none, market-if-touched, and is not limited to improving only on orders of the same type as the dynamic improved order. These different order types are known to those with skill in the art and need not be discussed with particularity.

Note that if a trader submits a traditional order using the next predetermined pricing increment, the type (e.g., stop, limit, etc.) of the order may determine whether the dynamic or price improved order remains in the stack.

One advantage of the invention is that it provides a monetary incentive for traders to trade items when price improvement orders for that item are available. For example, a trader may be provided with a rebate (e.g., a predetermined quantity of money), the quantity of which may depend on several factors (e.g., level of price improvement used and the size being traded). In one aspect of the invention, the size of the rebate may correspond to the level of price improvement used in matching orders. For example, a trader may receive a larger rebate for an order traded at a price improvement level of three than for an order traded at a price improvement level of one. It is understood that for a dynamic order, the rebate awarded to the trader may be based on the price improvement level of the order when matched. Alternatively, the rebate awarded to a trader using a dynamic order may be fixed, irrespective of the price improvement level of the order when matched.

In another aspect of the invention, an alternative rebate may be provided to the trader that decides to trade on a price improved order, but an order in the stack has a price improvement level of zero (i.e., the price improved order is the lone order in the stack). Because the price improvement level of the lone order is zero, the trader may not receive a rebate that corresponds to a particular level of price improvement. Rather, the trading system may provide the trader with the alternative rebate (e.g., a rebate that may be less than a rebate that would otherwise be received if the price improvement level is one or higher).

The trading system may send messages to traders to indicate what price improvement level is associated with their order. For example, when a user submits a dynamic price improvement order, the trading system may inform the trader which price improvement level is being used. Thereafter, if the price improvement level of the dynamic price improvement order changes, the system may transmit updated price improvement level information to the user.

Referring to FIG. 7, an exemplary system 700 for implementing the present invention is shown. As illustrated, system 700 may include one or more trading workstations 701 that may include a mouse 706, a keypad 707, and a display 708. Workstations 701 may be local or remote, and are connected by one or more communications links 702 to a computer network 703 that is linked via a communications link 705 to a server 704.

In system 700, server 704 may be any suitable server, processor, computer, or data processing device, or combination of the same. Computer network 703 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 702 and 705 may be any communications links suitable for communicating data between workstations 701 and server 704, such as network links, dial-up links, wireless links, hard-wired links, etc. Each workstation enables a participant to engage in the trading process. Workstations 701 may be personal computers, laptop computers, mainframe computers, dumb terminals, data displays, Internet browsers, Personal Digital Assistants (PDAs), two-way pagers, wireless terminals, portable telephones, etc., or any combination of the same.

A back office clearing center 712 may also be connected to server 704 of the trading system via communications link 710. Clearing center 712 may be any suitable equipment, such as a computer, or combination of the same, for causing trades to be cleared and/or verifying that trades are cleared. If desired, server 704 may contain multiple processors.

Thus, systems and methods for providing dynamic price improvement are provided. One skilled in the art will realize that the present invention can be practiced by other than the described embodiments, which are presented for purposes of illustration and not of limitation, and that the present invention is limited only by the claims which follow.

What is claimed is:

1. A method for operating an electronic trading system for the exchange of financial instruments, the method comprising the steps of:

in an electronic trading system designed to receive and store orders to buy and to sell financial instruments as submitted by traders, and substantially as orders are received, to execute trades between matching buy and sell orders, stored buy and sell orders having order matching priority orderings relative to each other reflecting at least one attribute of the order in addition to or instead of price, the order matching priority ordering used by the electronic trading system to determine priority among orders for matching for execution;

receiving a dynamic price improvement order, being an order to buy or sell an identified financial instrument traded on the electronic trading system, whose order matching priority for execution against contra orders is maintained by the electronic trading system at least in part relative to earlier-submitted orders on the same side of the market by adjusting a price associated with the dynamic price improvement order;

receiving orders contra to the dynamic price improvement order, and matching the contra orders to the stored orders on the same side of the market as the dynamic price improvement order substantially as the contra orders are received, the dynamic price improvement order being matched to the contra orders with the order matching priority relative to other orders as maintained by the electronic trading system, and executing transactions substantially as orders and contra orders are matched.

2. The method of claim 1, in which the adjusting of price includes an increase in the price of the dynamic price improvement order.

3. The method of claim 1, in which the adjusting of price includes a decrease in the price of the dynamic price improvement order.

4. The method of claim 1, in which the order matching priority of the dynamic price improvement order is a position at a front of a trading stack.

5. The method of claim 1, further comprising the step of:
maintaining order matching priority of the dynamic price improvement order relative to other orders based on a timestamp assigned to the dynamic price improvement order.

6. The method of claim 5, further comprising maintaining the order matching priority based on said timestamp.

7. The method of claim 5, wherein, when two or more said dynamic price improvement orders are received, the orders with older timestamps are matched prior to orders with newer timestamps.

8. The method of claim 1, wherein:
the electronic trading system reveals orders to users at a fixed price increment, and the price increment at which the price of the dynamic price improvement order is adjusted is a fraction of the revealed price increment.

9. The method of claim 1, wherein:
determining includes determining the price improvement level such that it is one level higher than the next best order in an order stack, wherein the price improvement level can be adjusted up to a maximum price improvement level.

10. The method of claim 1, further comprising the step of:
determining the price improvement level of a best order in an order stack; and assigning a price improvement level to said dynamic price improvement order that improves the price of said dynamic price improvement order by one price improvement level when the price improvement level of said best order is not a maximum price improvement level.

11. The method according to claim 10, further comprising the step of:
assigning said maximum price improvement level to said dynamic price improvement order when the price improvement level of said best order is at said maximum price improvement level.

12. The method of claim 1, wherein said dynamic price improvement order is the default order type for designated traders that use a trading interface to submit orders to the electronic trading system.

13. The method of claim 1, further comprising the step of:
providing to traders of the electronic trading system the option to select dynamic price improvement as one of several price improvement order types available for submission to said electronic trading system.

14. The method of claim 1 further comprising:
decreasing the price improvement level of at least one order on the same side of the market as the dynamic price improvement order such that the price improvement level of the at least one same-market-side order does not exceed the price improvement level assigned to the dynamic price improvement order.

15. The method of claim 14, wherein:
the price improvement level of the at least one second order is decreased to a price improvement level one level below a maximum price improvement level when the at least one price improved order is assigned a maximum price improvement level as its price improvement level.

16. A electronic trading system for the exchange of financial instruments, said system comprising at least one processor, the processor or processors of the system being configured to:
receive and store orders to buy and to sell financial instruments as submitted by traders, and substantially as orders are received, to execute trades between matching buy and sell orders, stored buy and sell orders having order matching priority orderings relative to each other reflecting at least one attribute of the order in addition to or instead of price, the order matching priority used by the electronic trading system to determine order matching priority among orders for matching for execution;

receive a dynamic price improvement order, being an order to buy or sell an identified a financial instrument traded on the electronic trading system, whose order matching priority for execution against contra orders is maintained by the electronic trading system at least in part relative to earlier-submitted orders on the same side of the market by adjusting a price associated with the dynamic price improvement order;

receive orders contra to the dynamic price improvement order, and match the contra order to the stored orders on the same side of the market as the dynamic price improvement order substantially as the contra orders are received, the dynamic price improvement order being matched to the contra orders with the order matching priority relative to other orders as maintained by the electronic trading system, and execute transactions substantially as orders and contra orders are matched.

17. The system of claim 16, in which the adjusting of price includes an increase in the price of the dynamic price improvement order.

18. The system of claim 16, in which the adjusting of price includes a decrease in the price of the dynamic price improvement order.

19. The system of claim 16, in which the order matching priority of the dynamic price improvement order is a position at a front of a trading stack.

20. The system of claim 16, wherein said processor is operative to maintain order matching priority of the dynamic price improvement order relative to other orders based on a timestamp assigned to the dynamic price improvement order.

21. The system of claim 20, wherein said processor is operative to maintain the order matching priority based on said timestamp.

22. The system of claim 16, wherein:
the electronic trading system reveals orders to users at a fixed price increment, and the price increment at which the price of the dynamic price improvement order is adjusted is a fraction of the revealed price increment.

23. The system of claim 16, wherein:
the processor is further operable to adjust the price of the dynamic price improvement order to one level more improved than the next best order in an order stack, wherein the price improvement level can be adjusted up to a maximum price improvement level.

24. The system of claim 16, wherein:
the processor is further operable to determine the price improvement level of a best order in an order stack; and assign a price improvement level to said dynamic price improvement order that improves the price of said dynamic price improvement order by one price improvement level when the price improvement level of said best order is not a maximum price improvement level.

25. The system of claim 24, wherein said processor is operative to assign said maximum price improvement level to said dynamic price improvement order when the price improvement level of said best order is at said maximum price improvement level.

26. The system of claim 16, wherein said dynamic price improvement order is the default order type for designated traders that use a trading interface to submit orders to the electronic trading system.

27. The system of claim 16, wherein:
said processor is operative to decrease the price improvement level of at least one order on the same side of the market as the dynamic price improvement order such that the price improvement level of the at least one same-market-side order does not exceed the price improvement level assigned to the dynamic price improvement order.

28. The system of claim 27, wherein the price improvement level of the at least one second order is decreased to a price improvement level one level below a maximum price improvement level when the at least one price improved order is assigned a maximum price improvement level as its price improvement level.

29. The system of claim 16, wherein:
the electronic treading system is operable to providing to traders of the electronic trading system the option to select dynamic price improvement as one of several price improvement order types available for submission to said electronic trading system.

30. The method of claim 1, in which a contra order matched to the dynamic price improvement order for execution is a lift or take of a standing offer.

31. The method of claim 1, in which a contra order matched to the dynamic price improvement order for execution is a hit of a standing bid.

* * * * *